United States Patent
Person et al.

(10) Patent No.: US 9,040,828 B2
(45) Date of Patent: May 26, 2015

(54) COATED CONDUCTOR WITH VOLTAGE STABILIZED INNER LAYER

(75) Inventors: Timothy J. Person, Freehold, NJ (US); Jeffrey M. Cogen, Flemington, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 246 days.

(21) Appl. No.: 13/822,236

(22) PCT Filed: Sep. 23, 2011

(86) PCT No.: PCT/US2011/052910
§ 371 (c)(1),
(2), (4) Date: Mar. 11, 2013

(87) PCT Pub. No.: WO2012/050792
PCT Pub. Date: Apr. 19, 2012

(65) Prior Publication Data
US 2013/0175070 A1    Jul. 11, 2013

Related U.S. Application Data

(60) Provisional application No. 61/388,292, filed on Sep. 30, 2010.

(51) Int. Cl.
*H01B 3/44* (2006.01)
*C08K 5/3492* (2006.01)
*H01B 7/28* (2006.01)

(52) U.S. Cl.
CPC ............. *H01B 3/441* (2013.01); *C08K 5/3492* (2013.01); *H01B 7/2813* (2013.01)

(58) Field of Classification Search
CPC .................................. H01B 3/44; H01B 3/441
USPC ...................... 174/120 SR; 524/100
See application file for complete search history.

(56) References Cited

U.S. PATENT DOCUMENTS

| | | |
|---|---|---|
| 3,522,183 A | 7/1970 | Heidt |
| 3,933,772 A | 1/1976 | Takahashi et al. |
| 4,870,121 A | 9/1989 | Bamji et al. |
| 5,246,783 A | 9/1993 | Spenadel et al. |

(Continued)

FOREIGN PATENT DOCUMENTS

| | | |
|---|---|---|
| EP | 2072576 A1 | 6/2009 |
| EP | 2163576 A1 | 3/2010 |

(Continued)

OTHER PUBLICATIONS

Englund et al., Polymer Degradation and Stability, 94 (2009), 823-833.

(Continued)

*Primary Examiner* — Timothy Thompson
*Assistant Examiner* — Charles Pizzuto
(74) *Attorney, Agent, or Firm* — Whyte Hirschboeck Dudek S.C.

(57) ABSTRACT

Disclosed are polymeric compositions with improved breakdown strength. The polymeric compositions contain a polyolefin and a voltage stabilizing agent. The voltage stabilizing agent contains a triazine. The triazine may include a substituent that enables keto-enol tautomerism, which provides the voltage stabilizing agent with additional energy dissipation capacity. The present polymeric compositions exhibit improved breakdown strength when applied as an insulating layer for power cable.

12 Claims, 2 Drawing Sheets

(56) References Cited

U.S. PATENT DOCUMENTS

| | | |
|---|---|---|
| 5,272,236 A | 12/1993 | Lai et al. |
| 5,278,272 A | 1/1994 | Lai et al. |
| 5,719,218 A | 2/1998 | Sarma |
| 5,986,028 A | 11/1999 | Lai et al. |
| 6,455,616 B1 | 9/2002 | Cogen |
| 6,496,629 B2 | 12/2002 | Ma et al. |
| 6,696,154 B2 | 2/2004 | Martinotto et al. |
| 6,714,707 B2 | 3/2004 | Rossi et al. |
| 6,858,296 B1 * | 2/2005 | Mendelsohn et al. ........ 428/383 |
| 7,683,113 B2 | 3/2010 | Easter |
| 2009/0249645 A1 * | 10/2009 | Kajihara et al. ................. 36/87 |
| 2009/0301756 A1 * | 12/2009 | Hase et al. .............. 174/120 SR |
| 2013/0175070 A1 * | 7/2013 | Person et al. ........... 174/120 SR |
| 2014/0017494 A1 * | 1/2014 | Liu et al. ....................... 428/379 |
| 2014/0182883 A1 * | 7/2014 | Sugita et al. .............. 174/113 R |
| 2014/0235767 A1 * | 8/2014 | Hatanaka et al. ............. 524/100 |
| 2015/0014030 A1 * | 1/2015 | Mitamura et al. ............ 174/257 |

FOREIGN PATENT DOCUMENTS

| | | |
|---|---|---|
| WO | 01/08166 A1 | 2/2001 |
| WO | 02/070600 A2 | 9/2002 |

OTHER PUBLICATIONS

Randall, JMS-Rev. Macromol. Chem. Phys., C29(2&3), 201-317 (1989).

* cited by examiner

COATED CONDUCTOR WITH VOLTAGE STABILIZED INNER LAYER

CROSS REFERENCE TO RELATED APPLICATION

The present application is the national phase of PCT Patent Application No. PCT/US2011/052910 filed Sep. 23, 2011, which claims priority to U.S. provisional application Ser. No. 61/388,292 filed on Sep. 30, 2010, the entire content of which is incorporated by reference herein.

BACKGROUND

A typical power cable includes one or more conductors in a cable core surrounded by one or more layers of polymeric material. Medium voltage (6 to 36 kV) and high voltage (greater than 36 kV) and extra high voltage (greater than 220 kV) cable typically include a core surrounded by an inner semiconducting layer, followed by an insulating layer, and then an outer semiconducting layer, and an outermost layer (or sheath).

The load-carrying capacity of a cable system is limited, in part, by the heat transfer away from the conductor. Polyolefins, such as polyethylene, are frequently utilized in the insulating layer and/or in the semiconducting layer. Polyethylene has a low dielectric permittivity and a relatively high electrical breakdown strength.

Known are voltage stabilizing agents for polyolefin compositions that increase electrical breakdown strength of insulating layers in power cable. Conventional voltage stabilizing agents (such as the family of polycyclic aromatics, e.g. acenes), however, have poor compatibility with polyolefins. The art recognizes the continuous need for voltage stabilizing agents compatible with polyolefins for (i) increased electrical breakdown strength of cable insulation material, (ii) increased reliability with existing cable designs and/or (iii) provision of high-stress designs that are able to deliver increased amounts of energy.

SUMMARY

The present disclosure is directed to polymeric compositions with improved electrical breakdown strength. The present polymeric compositions are composed of (i) a polymeric component and (ii) a voltage stabilizing agent (VSA) and exhibit improved electrical breakdown strength and increased endurance to high electrical stress. The present voltage stabilizing agents are compatible with polyolefin, and increase electrical breakdown strength to the polyolefin, while imparting little impact on crosslinking chemistry typically practiced in power cable insulating compositions. The present polymeric compositions find use as an insulating layer in wire and cable applications and power cable in particular.

In an embodiment, a coated conductor is provided and includes a conductor, an outermost opaque layer, and an inner layer—the layers located on the conductor. The inner layer is located between the conductor and the outermost layer. The inner layer is composed of a polymeric composition. The polymeric composition includes a polyolefin, and a triazine of the structure (I) below.

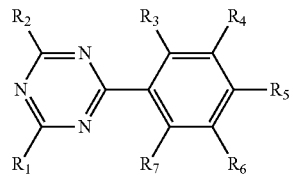

$R_1$-$R_7$ are the same or different. Each of $R_1$-$R_7$ is selected from hydrogen, a $C_1$-$C_{30}$ hydrocarbyl group, a substituted $C_1$-$C_{30}$ hydrocarbyl group, a hydroxyl group, and combinations thereof.

An advantage of the present disclosure is a polymeric composition with improved breakdown strength.

An advantage of the present disclosure is a voltage stabilizing agent with improved compatibility with polyolefin.

An advantage of the present disclosure is a voltage stabilizing agent that reduces treeing in a polymeric composition

DETAILED DESCRIPTION

Figure 1:
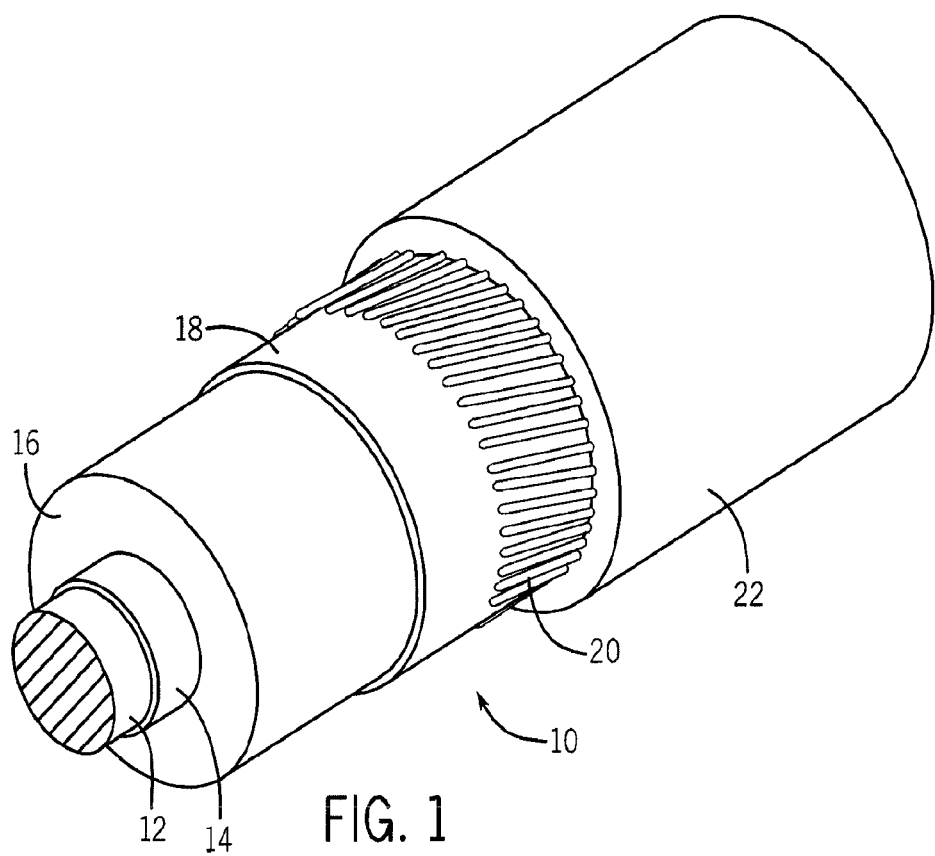
FIG. 1 is a perspective view of a power cable in accordance with an embodiment of the present disclosure.
Figure 2:
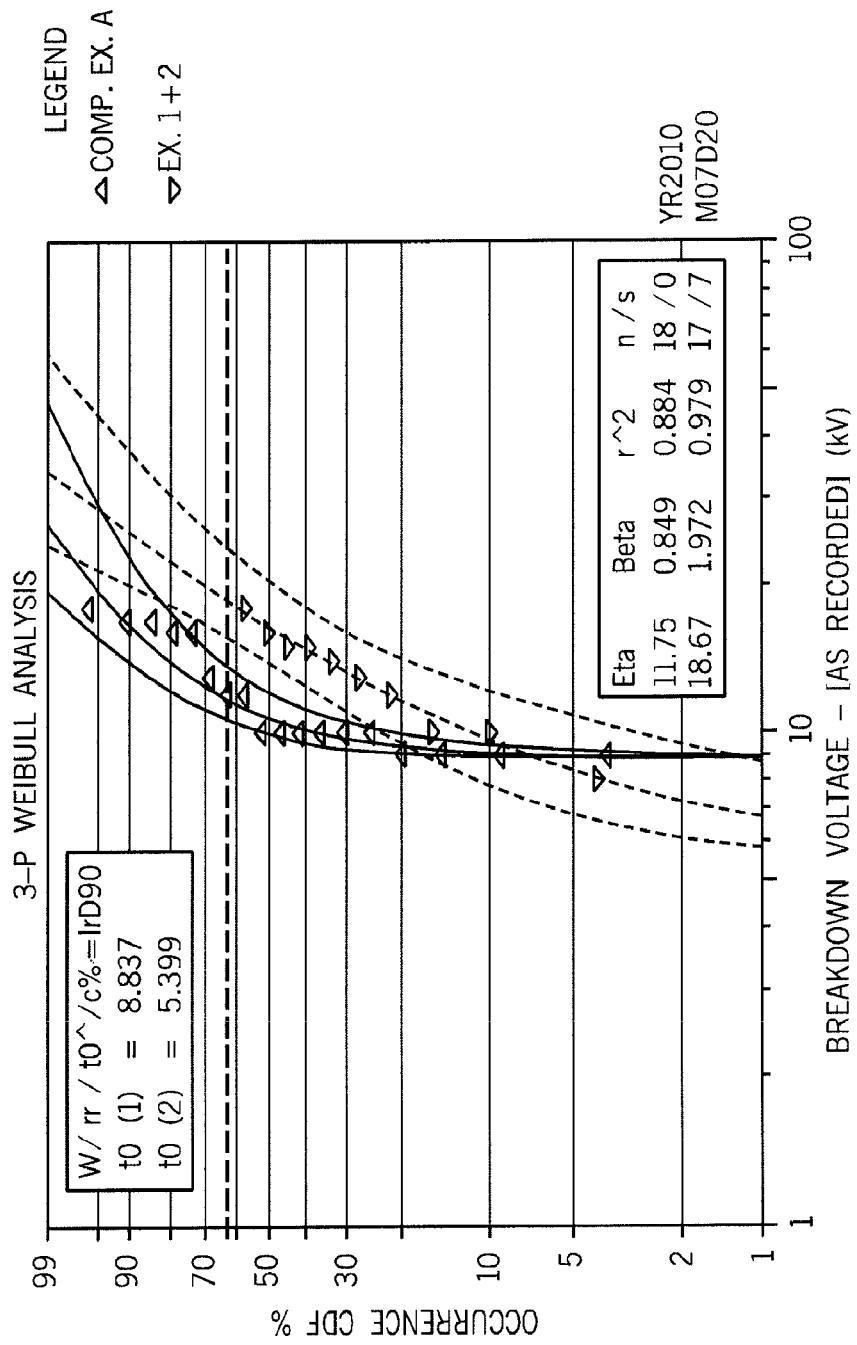
FIG. 2 is a Weibull analysis for polymeric compositions of Examples 1 and 2 in accordance with embodiments of the present disclosure.

The present disclosure provides a polymeric composition. The polymeric composition includes (i) a polymeric component, (ii) a voltage stabilizing agent, and (iii) optionally other additives.

The polymeric component may include thermoplastics and/or thermoset material (such as silicone rubber). The polymeric component may be crosslinked or may be non-crosslinked. Nonlimiting examples of suitable thermoplastics include, polyurethanes, polyolefins, polyacetals, polycarbonates, vinyl polymers, polyamides, polyimides, acrylics, polystyrenes, polysulfones, polyetherketones, cellulosics, polyesters, polyethers, fluoropolymers, and copolymers thereof such as olefin-vinyl copolymers, olefin-allyl copolymers and copolymers of polyethers and polyamides. Examples of vinyl polymers include polyvinyl chloride, polyvinyl acetate, vinyl chloride/vinyl acetate copolymers, polyvinyl alcohol and polyvinyl acetal.

When it is desired to use a crosslinked polymeric component, crosslinking can be accomplished by one or more of the following nonlimiting procedures: free radical crosslinking (i.e., peroxide cross-linking); radiation cross-linking (electron accelerators, gamma-rays, high energy radiation, such as X-rays, microwaves, etc.); thermal crosslinking, and/or moisture cure crosslinking (i.e., silane-graft).

In an embodiment, the polymeric component is a polyolefin. Nonlimiting examples of suitable polyolefins are homopolymers and copolymers containing one or more $C_2$-$C_{20}$ α-olefins. For purposes of this disclosure, ethylene is considered an α-olefin. Nonlimiting examples of suitable α-olefins include ethylene, propylene, isobutylene, 1-butene, 1-pentene, 1-hexene, 4-methyl-1-pentene, and 1-octene. Nonlimiting examples of suitable polyolefins include ethylene-based polymer, propylene-based polymer, and combinations thereof. An "ethylene-based polymer", or "polyethylene" and like terms is a polymer containing at least 50 mole percent (mol %) units derived from ethylene. A "propylene-based polymer," or "polypropylene" and like terms is a polymer containing at least 50 mole percent units derived from propylene.

In an embodiment, the polymeric component is an ethylene-based polymer. The ethylene-based polymer may be ethylene homopolymer or an ethylene/α-olefin interpolymer. The α-olefin content is from about 5, or about 10, or about 15, or about 20, or about 25, wt % to less than 50, or less than about 45, or less than about 40, or less than about 35, wt % based on the weight of the interpolymer. The α-olefin content is measured by $^{13}$C nuclear magnetic resonance (NMR) spectroscopy using the procedure described in Randall (*Rev. Macromol. Chem. Phys.*, C29 (2&3)). Generally, the greater the α-olefin content of the interpolymer, the lower the density and the more amorphous the interpolymer, and this translates into desirable physical and chemical properties for the protective insulation layer.

The α-olefin is a $C_{3-20}$ linear, branched or cyclic α-olefin. Nonlimiting examples of suitable of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this disclosure certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this disclosure. Nonlimiting examples of suitable ethylene-based polymers include the following copolymers: ethylene/propylene, ethylene/butene, ethylene/1-hexene, ethylene/1-octene, ethylene/styrene, ethylene-vinyl acetate, ethylene-vinyl propionate, ethylene-vinyl isobutyrate, ethylene-vinyl alcohol, ethylenemethyl acrylate, ethylene-ethyl acrylate, ethyleneethyl methacrylate, ethylene/butyl-acrylate copolymers (EBA), ethylene-allyl benzene, ethylene-allyl ether, and ethylene-acrolein; ethylene-propylene (EPR) or ethylene-propylene-diene (EPDM) rubbers; natural rubbers; butyl rubbers and the like.

Nonlimiting examples of suitable terpolymers include ethylene/propylene/1-octene, ethylene/propylene/butene, ethylene/butene/1-octene, ethylene/propylene/diene monomer (EPDM) and ethylene/butene/styrene. The copolymers/interpolymers can be random or blocky.

The ethylene-based polymer can be high density polyethylene (HDPE), medium density polyethylene, (MDPE), low density polyethylene, (LDPE), linear low density polyethylene (LLDPE), and/or very low density polyethylene (VLDPE). The ethylene-based polymers used in the practice of this disclosure can be used alone or in combination with one or more other ethylene-based polymers, e.g., a blend of two or more ethylene-based polymers that are "different from one another," which means the ethylene-based polymers are uncommon by way of at least one property such as: monomer/comonomer composition and content, melt index, melt temperature, degree of branching, catalytic method of preparation, etc. If the ethylene-based polymer is a blend of two or more ethylene-based polymers, then the ethylene-based polymers can be blended by any in-reactor or post-reactor process. The reactors can be charged with the same catalyst but operated at different conditions, e.g., different reactant concentrations, temperatures, pressures, etc, or operated at the same conditions but charged with different catalysts.

Examples of ethylene-based polymers made with high pressure processes include (but are not limited to) low density polyethylene (LDPE), ethylene vinyl acetate copolymer (EVA), ethylene ethyl acrylate copolymer (EEA), and ethylene silane acrylate terpolymers.

Nonlimiting examples of ethylene-based polymers include very low density polyethylene (VLDPE) (e.g., FLEXOMER® ethylene/1-hexene polyethylene made by The Dow Chemical Company), homogeneously branched, linear ethylene/α-olefin copolymers (e.g., TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and ethylene block copolymers (e.g., INFUSE® polyethylene available from The Dow Chemical Company). Substantially linear ethylene copolymer is described in U.S. Pat. Nos. 5,272,236, 5,278,272 and 5,986,028.

Voltage Stabilizing Agent

In addition to the polymeric component, the polymeric composition also includes a voltage stabilizing agent (or VSA). A "voltage stabilizing agent," as used herein, is a compound which reduces the damage to a polymeric material when exposed to an electric field. It has been considered that a VSA may trap or deactivate electrons to inhibit electrical treeing in an insulation material, or otherwise to provide effective screening of high localized fields (near defects or contaminants) to thereby reduce the energy and/or frequency of injected electrons which may impart damage to the polyolefin. Blending the VSA with the polymeric component inhibits or otherwise retards treeing. Bounded by no particular theory, it is believed the VSA fills and/or surrounds defects in the polymeric component, the defects being points of tree initiation. Defects include voids and/or impurities present in the polymeric component.

The polymeric composition includes (i) a polyolefin, (ii) a VSA containing a triazine, and (iii) optional additives. The triazine has the structure (I) below.

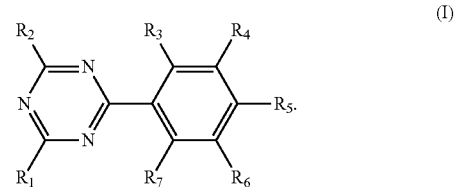

$R_1$-$R_7$ are the same or different. Each of $R_1$-$R_7$ is selected from hydrogen, a $C_1$-$C_{30}$ hydrocarbyl group, a substituted $C_1$-$C_{30}$ hydrocarbyl group, a hydroxyl group, and combinations thereof.

As used herein, the term "hydrocarbyl" or "hydrocarbon" is a substituent containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl-, and alkynyl-groups.

As used herein, the term "substituted hydrocarbyl" or "substituted hydrocarbon" is a hydrocarbyl group that is substituted with one or more nonhydrocarbyl substituent groups. A nonlimiting example of a nonhydrocarbyl substituent group is a heteroatom. As used herein, a "heteroatom" is an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group is a hydrocarbyl group that is substituted with one or more halogen atoms. An example of substituted hydrocarbyl is an alkoxy group.

In an embodiment, the polyolefin is a polyethylene.

In an embodiment, the polyolefin is a crosslinked polyethylene.

In an embodiment, at least one of $R_1$-$R_2$ is a $C_1$-$C_{30}$ hydrocarbyl group.

In an embodiment, at least one of $R_1$-$R_2$ is a substituted $C_1$-$C_{30}$ hydrocarbyl group.

In an embodiment, at least one of $R_1$ and $R_2$ includes an aryl group.

In an embodiment, each of $R_1$-$R_2$ includes an aryl group.

In an embodiment, the triazine is capable of keto-enol tautomerism. In this embodiment, at least one of $R_3$ and $R_7$ is a hydroxyl group. Bounded by no particular theory, it is believed that keto-enol tautomerism provides the VSA with enhanced energy dissipation. Keto-enol tautomerism provides the triazine additional capability for electron capture.

A nonlimiting example of a triazine capable of keto-enol tautomerism is the triazine of structure (II) below.

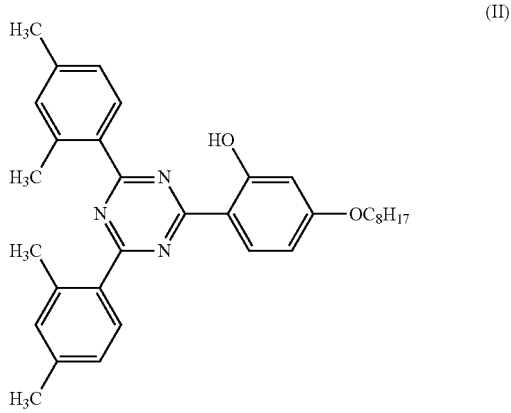

(II)

In an embodiment, the polymeric composition contains from about 0.1 wt %, or about 0.2 wt % to about 3 wt %, or about 1 wt % of the triazine. The triazine can be any previously disclosed triazine of structure (I) and/or structure (II).

In an embodiment, the VSA can be a mixture of two different triazines of the structure (I) and/or structure (II).

The foregoing VSAs unexpectedly improve electrical breakdown strength in insulating layers containing the present polymeric compositions. The improvement in electrical breakdown strength can be seen in the increased breakdown voltages exhibited in Examples 1 and 2 described hereafter.

Moreover, the present VSAs exhibit good solubility in the polyolefin matrix and a low migration tendency. The present VSAs can be utilized effectively with other components of the polymeric composition, in particular to cross-linking agents.

Additives

Any of the foregoing polymeric compositions may optionally contain one or more additives. Nonlimiting examples of suitable additives include antioxidants, stabilizers, processing aids, scorch retarders, and/or cross-linking boosters. As antioxidant, sterically hindered or semi-hindered phenols, aromatic amines, aliphatic sterically hindered amines, organic phosphites, thio compounds, and mixtures thereof, can be mentioned. Typical cross-linking boosters may include compounds having a vinyl or an allyl group, e.g. triallylcyanurate, triallylisocyanurate, and di-, tri- or tetra-acrylates. As further additives, flame retardant additives, acid scavengers, inorganic fillers, water-tree retardants and other voltage stabilizers can be mentioned A "scorch retarder," as used herein is a compound that reduces the formation of scorch during extrusion of a polymer composition, at typical extrusion temperatures used, when compared to the same polymer composition extruded without said compound. Besides scorch retarding properties, the scorch retarder may simultaneously result in further effects like boosting, i.e. enhancing cross-linking performance during the cross-linking step.

The polymeric composition may comprise two or more embodiments disclosed herein.

Coated Conductor

The present disclosure provides articles containing the present polymeric compositions. In an embodiment, the article includes a conductor and a coating on the conductor. This forms a coated conductor. The conductor may be a single cable or a plurality of cables bound together (i.e., a cable core, or a core). The coated conductor may be flexible, semi-rigid, or rigid. Nonlimiting examples of suitable coated conductors include flexible wiring such as flexible wiring for consumer electronics, a power cable, a power charger wire for cell phones and/or computers, computer data cords, power cords, appliance wiring material, and consumer electronic accessory cords.

A coating is located on the conductor. The coating may be one or more inner layers such as an insulating layer and/or a shielding layer and/or a semiconducting layer. The coating may also include one or more outer layer(s) (also referred to as a "jacket" or a "sheath"). The coating includes any of the present polymer compositions as disclosed herein. As used herein, "on" includes direct contact or indirect contact between the coating (or a layer) and the conductor. "Direct contact" is a configuration whereby the coating immediately contacts the conductor, with no intervening layer(s) and/or no intervening material(s) located between the coating and the conductor. "Indirect contact" is a configuration whereby an intervening layer(s) and/or an intervening structure(s) or material(s) is/are located between the conductor and the coating. The coating may wholly or partially cover or otherwise surround or encase the conductor. The coating may be the sole component surrounding the conductor. Alternatively, the coating may be one layer of a multilayer structure, jacket, or sheath encasing the metal conductor.

In an embodiment, a coated conductor is provided and includes a conductor, an inner layer and an outermost opaque layer (or sheath). The outermost opaque layer is the exposed layer or the layer in contact with the ambient environment. The inner layer is located between the conductor and the outermost layer. In other words, the inner layer is not exposed to the ambient environment, and/or is not exposed to sunlight. The inner layer includes the polymeric composition containing polyolefin and the VSA as disclosed above. The VSA can be any triazine of structure (I) and/or structure (II) or a blend of two different triazines as disclosed herein.

In an embodiment, the inner layer (containing polyolefin and VSA) excludes layer(s) exposed to sunlight.

In an embodiment, the polymeric composition of the inner layer contains a polyethylene.

In an embodiment, the polymeric composition of the inner layer contains a crosslinked polyethylene.

In an embodiment, the coated conductor is a power cable operating at a voltage greater than 1 kV, or greater than 6 kV to 36 kV (medium voltage), or greater than 36 kV (high voltage), or greater than 220 kV (extra high voltage). FIG. 1 shows an insulated power cable 10 (i.e., a coated conductor) which includes a metallic conductor 12, an internal shielding layer 14, an insulating layer 16, an external shielding layer 18, a metallic screen 20 of wound wires or conducting bands, and an outermost layer 22 (also known as a sheath). The outermost layer 22 is opaque.

In an embodiment, the internal shielding layer 14 and/or the insulating layer 16 and/or the external shielding layer 18 are/is composed of a polymeric composition containing polyethylene and triazine of the structure (I) and/or (II). In other words, the inner layer can be an insulating layer and/or a shielding layer, one or both of which contain the present polymeric composition.

The present coated metal conductor may comprise two or more embodiment disclosed herein.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The term "alkyl," as used herein, refers to a branched or unbranched, saturated hydrocarbon radical. Nonlimiting examples of suitable alkyl radicals include, for example, methyl, ethyl, n-propyl, i-propyl, n-butyl, t-butyl, i-butyl (or 2-methylpropyl), etc. The alkyls have 1 to 30 carbon atoms.

The term "aryl" or "aryl group," as used herein, is a substituent derived from an aromatic hydrocarbon compound. An aryl group has a total of from six to twenty ring atoms, and has one or more rings which are separate or fused, and may be substituted with alkyl and/or halo groups. The aromatic ring(s) may include phenyl, naphthyl, anthracenyl, and biphenyl, among others.

The term "arylalkyl" or "arylalkyl group," as used herein, is a compound containing both aliphatic and aromatic structures. The term "arylalkyl group" includes "aralkyl groups" (an alkyl group substituted by at least one aryl group) and/or "alkylaryl groups" (an aryl group substituted by at least one alkyl group).

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The "breakdown voltage" of an insulator is the minimum voltage that causes a portion of an insulator to become electrically conductive.

"Cable" and like terms is at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition" and like terms mean a mixture or blend of two or more components.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

A "conductor" is an element of elongated shape (wire, cable, fiber) for transferring energy at any voltage (DC, AC, or transient). The conductor is typically at least one metal wire or at least one metal cable (such as aluminum or copper) but may include optical fiber.

"Crosslinked," "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

An "insulating layer" is a layer having a volume resistivity greater than $10^{10}$ ohm-cm, or greater than $10^{12}$ ohm-cm.

A "layer," as used herein, is a polymer-based layer surrounding the conductor, for example, an electrically insulating layer, a semiconductive layer, a sheath, a protective layer, a water blocking layer, or a layer performing combined functions, for example, a protective layer charged with a conductive filler.

The term "medium voltage" generally means a voltage of between 6 kV and about 36 kV, whereas "high voltage" means voltages higher than 36 kV, and "extra high voltage" generally means voltages greater than 220 kV. The skilled artisan understands that these general voltage ranges may be different outside of the United States.

The term "opaque," as used herein, is a material that blocks at least natural light (i.e., sunlight). In other words, an opaque material is impenetrable to light energy having a wavelength from about 250 nm to about 800 nm.

The term "polymer" is a macromolecular compound prepared by polymerizing monomers of the same or different type. "Polymer" includes homopolymers, copolymers, terpolymers, interpolymers, and so on. The term "interpolymer" is a polymer prepared by the polymerization of at least two types of monomers or comonomers. It includes, but is not limited to, copolymers (which usually refers to polymers prepared from two different types of monomers or comonomers), terpolymers (which usually refers to polymers prepared from three different types of monomers or comonomers), tetrapolymers (which usually refers to polymers prepared from four different types of monomers or comonomers), and the like.

A "shielding layer" may be semiconductive or resistive. A shielding layer having semiconductive properties has a volumetric resistivity value, of less than 1000 Ω-m, or less than 500 Ω-m, when measured at 90° C. A shielding layer having resistive properties has a volumetric resistivity value greater than a semiconductive layer. A shielding layer having resistive properties typically has a dielectric constant greater than about 10.

TEST METHODS

Melt index (MI) is measured in accordance with ASTM D 1238-01 test method at 190° C. with a 2.16 kg weight for ethylene-based polymers.

By way of example, and not by limitation, examples of the present disclosure are provided.

EXAMPLES

Sample Preparation

Polyethylene homopolymer (0.92 g/cc, MI 2.0 g/10 min) is melt fluxed in a Brabender mixing bowl, after which voltage stabilizing agent is melt-compounded into the polyethylene at a target mix temperature and 30 rpm for 5 minutes to insure adequate incorporation. The polymeric composition is removed from the mixing bowl and compression molded into a slab that is 0.25 inches thick. Compression molding is achieved using a pressure of 300-500 psi and a temperature of 140° C. for 3 minutes, after which the pressure is increased above 2000 psi while maintaining the sample at 140° C. for an additional 3 minutes. The high pressure is then maintained while the sample cools.

1 inch square specimens are die-cut from the slab and pre-drilled to a depth of 0.5 inches along one of the major axes. Steel needles (60° cone, 3 micron tip radius) are inserted into the pre-drilled holes and placed into a jig to complete the insertion at elevated temperature. The entire jig is conditioned in a circulating air oven for 1 hour at 105° C., after which the needle is advanced into the softened polymer at a rate of approximately 1 mm every 5 minutes while remaining in the 105° C. oven. The needles are advanced to a stop which produces a point-to-plane distance of approximately 1.9 mm.

A series of specimens are energized to an applied 6 kV 60 Hz voltage for 30 minutes, followed by an increase in the applied voltage of 1 kV every 30 minutes up to a maximum 18 kV test voltage. The breakdown voltage for each specimen is recorded for evaluation of the characteristic voltage as the scale parameter of a fitted Weibull failure distribution.

Example 1 is LDPE containing 1.4 wt % CYASORB® UV-1164, 2-[4,6-bis(2,4-dimethylphenyl)-1,3,5-triazin-2-yl]-5-(octyloxy)phenol (CAS 2725-22-6), available from Cytec Industries.

Example 2 is LDPE containing 2.8 wt % CYASORB® UV-1164.

Comparative Sample A is LDPE with no voltage stabilizing agent mixed at a temperature of 140° C.

Comparative Sample B is LDPE containing 1 wt % Chimassorb 944, a hindered amine stabilizer.

Comparative Sample C is LDPE containing 1% wt Cyassorb UV-3346, a light stabilizer.

Comparative Sample A (CS-A)

A series of 18 specimens of Comparative Sample A are fit to a 2-parameter Weibull failure distribution. The data exhibits significant non-linearity leading to poor correlation ($r^2$ of 0.75). A 3-parameter Weibull failure distribution is found to be better suited to describe the failure distribution ($r^2$ of 0.88), with an offset t0=8.8 kV. A 3-parameter Weibull characteristic voltage of 11.7 kV is determined for Comparative Sample A, with a 90% confidence interval which spanned 10.7 to 13.7 kV.

Comparative Sample B (CS-B)

The composition of Comparative Sample B is prepared according in the same manner as the LDPE control (Comparative Sample A), using a compounding temperature of 140° C. 10 specimens are prepared and evaluated according to the needle voltage-step rise breakdown test.

Comparative Sample C(CS-C)

The composition of Comparative Sample C is prepared according in the same manner as the LDPE control (Comparative Sample A), using a compounding temperature of 140° C. 9 specimens are prepared and evaluated according to the needle voltage-step rise breakdown test.

Example 1

Nine specimens of Example 1 are evaluated, yet four of the nine survive the voltage ramp throughout the maximum 18 kV test voltage. These survivors are included in the Weibull statistical analysis as "suspensions" (with failure voltage of >18 kV). A 2-parameter characteristic voltage for Example 1 is determined to be 18.5 kV with a good fit of the failure distribution ($r^2$=0.97).

Example 2

Eight specimens of Example 2 are evaluated, yet three of the eight survive the voltage ramp throughout the maximum 18 kV test voltage. These survivors are included in the Weibull statistical analysis as "suspensions" (with failure voltage of >18 kV). A 2-parameter characteristic voltage for Example 2 is determined to be 17.5 kV with a good fit of the failure distribution (r^2=0.85).

The characteristic voltage determined for Examples 1 and 2 are similar and higher than that of Comparative Sample A. With no statistical distinction between Examples 1 and 2, it is useful to combine the failure distributions into a single sample set to represent the impact of the presence of the voltage stabilizing agent. The composite failure distribution of Examples 1 and 2 is found to be a good fit (r^2 of 0.97) to a 2-parameter Weibull distribution with a characteristic voltage of 17.7 kV, with a 90% confidence interval which spanned 16.0 to 22.2 kV.

If a 3-parameter Weibull fit is utilized for the composite failure distribution (as was done for the Comparative Sample A), the result characteristic voltage for the composite distribution is 18.7 kV (r^2=0.97), with a 90% confidence interval than spanned 15.8 to 23.8 kV. The offset t0 is estimated to be 5.4 kV.

The separation between the lower confidence bound of the composite failure distribution and the upper confidence bound of the failure distribution for Comparative Sample A clearly demonstrate an advantaged characteristic voltage through the use of the voltage stabilizing agents as described in the present disclosure.

The results of the breakdown tests are shown in Table 1 below.

TABLE 1

| | n/s | Weibull characteristic breakdown voltage (kV) | 90% Confidence Interval (kV) |
|---|---|---|---|
| Comp. Sample A | 18/0 | 11.7 | 10.7-13.7 |
| Comp. Sample B | 10/0 | 9.5 | 9.0-10.3 |
| Comp. Sample C | 9/0 | 9.7 | 9.0-10.8 |
| Example 1 | 9/4 | 17.4 | 15.5-23.5 |
| Example 2 | 8/3 | 17.6 | 14.8-24.7 |
| Example 1 + 2 | 17/7 | 18.7 | 15.8-23.8 |

Table 1 shows that not all light stabilizers are effective as voltage stabilizers. CS-B and CS-C, each containing a light stabilizer, are not effective voltage stabilizing compositions as each of CS-B and CS-C has a breakdown voltage less than the breakdown voltage of LDPE alone (CS-A). The results of CS-B and CS-C show the unpredictabilty of utilizing light stabilizers as voltage stabilizers.

Surprisingly and unexpectedly, Examples 1 and 2 each exhibit improved breakdown strength in view of (i) LDPE alone (CS-A) and (ii) exhibit improved breakdown strength compared to other light stabilized compositions (CS-B, CS-C). Applicants have surprisingly discovered that the triazine of structure (I) unforeseeably provides improved voltage stability to insulating layer for coated conductors. The voltage stability provided by triazine of structure (I) is unexpected in view of the unpredictability of light stabilizers as effective voltage stabilizers.

It is specifically intended that the present disclosure not be limited to the embodiments and illustrations contained herein, but include modified forms of those embodiments including portions of the embodiments and combinations of elements of different embodiments as come within the scope of the following claims.

We claim:
1. A coated conductor comprising:
   a conductor;
   an outermost opaque layer;
   an inner layer on the conductor and located between the conductor and the outermost layer, the inner layer comprising a polymeric composition comprising
   a polyolefin; and
   a triazine of the structure (I)

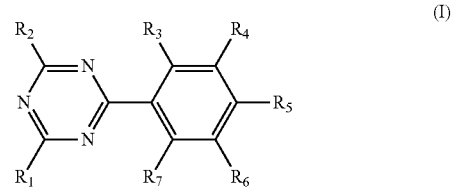

wherein $R_1$-$R_7$ are the same or different, and each of $R_1$-$R_7$ is selected from the group consisting of hydrogen, a $C_1$-$C_{30}$ hydrocarbyl group, a substituted $C_1$-$C_{30}$ hydrocarbyl group, a hydroxyl group, and combinations thereof.

2. The coated conductor of claim 1 wherein the polyolefin is a polyethylene.

3. The coated conductor of claim 1 wherein the polyolefin is a crosslinked polyethylene.

4. The polymeric composition of claim 1 wherein at least one of $R_1$-$R_2$ is a $C_1$-$C_{30}$ hydrocarbyl group.

5. The polymeric composition of claim 1 wherein at least one of $R_1$-$R_2$ is a substituted $C_1$-$C_{30}$ hydrocarbyl group.

6. The coated conductor of claim 1 wherein at least one of $R_1$-$R_2$ comprises an aryl group.

7. The coated conductor of claim 1 wherein each of $R_1$-$R_2$ comprises an aryl group.

8. The polymeric composition of claim 1 comprising from about 0.1 wt % to about 3 wt % of the triazine.

9. The coated conductor of claim 1 wherein the coated conductor is selected from the group consisting of a medium voltage power cable, a high voltage power cable, and an extra high voltage power cable.

10. The coated conductor of claim 1 wherein the inner layer is an insulating layer.

11. The coated conductor of claim 1 wherein the inner layer is a shielding layer.

12. The coated conductor of claim 1 wherein the triazine has the structure (II)

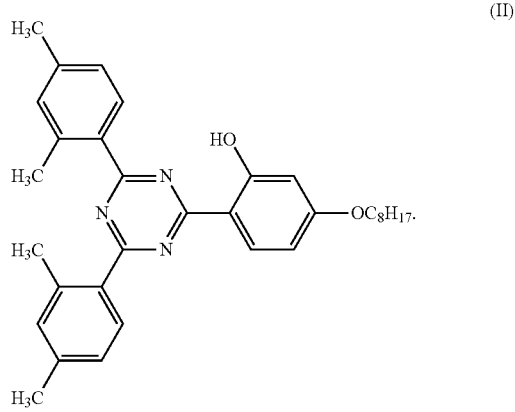

* * * * *